United States Patent
Vacano et al.

(10) Patent No.: US 10,280,237 B2
(45) Date of Patent: *May 7, 2019

(54) SALTS OF ETHERAMINES AND POLYMERIC ACID

(71) Applicant: BASF SE, Ludwigshafen (DE)

(72) Inventors: Bernhard Ulrich von Vacano, Mannheim (DE); Sophia Ebert, Mannheim (DE); Bjoern Ludolph, Ludwigshafen (DE); Christof Wilhelm Wigbers, Mannheim (DE); Christian Eidamshaus, Mannheim (DE); Brian J. Loughnane, Sharonville, OH (US); Frank Huelskoetter, Bad Duerkheim (DE); Stefano Scialla, Rome (IT)

(73) Assignee: BASF SE, Ludwigshafen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 15/508,606

(22) PCT Filed: Aug. 11, 2015

(86) PCT No.: PCT/EP2015/068447
§ 371 (c)(1),
(2) Date: Mar. 3, 2017

(87) PCT Pub. No.: WO2016/041697
PCT Pub. Date: Mar. 24, 2016

(65) Prior Publication Data
US 2017/0275395 A1    Sep. 28, 2017

Related U.S. Application Data

(60) Provisional application No. 62/050,210, filed on Sep. 15, 2014.

(51) Int. Cl.
*C08F 8/44* (2006.01)
*C11D 3/37* (2006.01)
*C08J 3/12* (2006.01)

(52) U.S. Cl.
CPC ...... *C08F 8/44* (2013.01); *C08J 3/12* (2013.01); *C11D 3/3707* (2013.01); *C11D 3/3723* (2013.01); *C08J 2333/02* (2013.01)

(58) Field of Classification Search
CPC ...... C08F 8/44; C08G 65/04; C08G 65/33303
See application file for complete search history.

(56) References Cited

U.S. PATENT DOCUMENTS

| | | | | |
|---|---|---|---|---|
| 3,654,370 | A * | 4/1972 | Yeakey | C07D 265/30 544/162 |
| 6,437,055 | B1 | 8/2002 | Moriarity et al. | |
| 2008/0033082 | A1* | 2/2008 | Hahn | B60C 1/00 524/114 |
| 2013/0121948 | A1 | 5/2013 | Dussaud | |
| 2014/0296124 | A1* | 10/2014 | Hulskotter | C11D 3/0036 510/300 |
| 2015/0057212 | A1 | 2/2015 | Hulskotter et al. | |
| 2015/0057213 | A1 | 2/2015 | Hulskotter et al. | |
| 2015/0329476 | A1 | 11/2015 | Ebert et al. | |
| 2016/0052867 | A1 | 2/2016 | Ebert et al. | |
| 2016/0075975 | A1 | 3/2016 | Loughnane et al. | |
| 2016/0251304 | A1 | 9/2016 | Ebert et al. | |

FOREIGN PATENT DOCUMENTS

| | | |
|---|---|---|
| EP | 0696572 B1 | 10/1997 |
| WO | 2004/007897 A2 | 1/2004 |
| WO | 2004/020506 A2 | 3/2004 |
| WO | 09/138387 A1 | 11/2009 |
| WO | 09/153193 A1 | 12/2009 |
| WO | 10/010075 A1 | 1/2010 |
| WO | 10/026030 A1 | 3/2010 |
| WO | 10/026066 A1 | 3/2010 |
| WO | 2011/067199 A1 | 6/2011 |
| WO | 2011/067200 A1 | 6/2011 |
| WO | 2011/068658 A1 | 6/2011 |
| WO | 2015144436 A1 | 10/2015 |

OTHER PUBLICATIONS

Wang, Macromol. Chem. Phys. 2004, 205, p. 1774-1781 (Year: 2004).*
International Search Report in International Application No. PCT/EP2015/068447 dated Feb. 8, 2016.
Written Opinion issued in International Application No. PCT/EP2015/068447 dated Mar. 24, 2016.
Wang Y, et al., "Association behavior between end-functionalized block copolymers PEO-PPO-PEO and poly(acrylic acid)," Macromolecular Chemistry and Physics, Wiley-VCH Verlag, Weinheim, DE, vol. 205, No. 13, Aug. 30, 2004, pp. 1774-1781.

* cited by examiner

*Primary Examiner* — Robert C Boyle
(74) *Attorney, Agent, or Firm* — Armstrong Teasdale LLP

(57) ABSTRACT

The present invention relates to salts of etheramines and polymeric acid, and in particular to salts of etheramines and polycarboxylic acid and their manufacturing process.

17 Claims, No Drawings

SALTS OF ETHERAMINES AND POLYMERIC ACID

CROSS-REFERENCE TO RELATED APPLICATIONS

This application is a U.S. National Phase Application of PCT/EP2015/068447, filed Aug. 11, 2015, which claims the benefit of priority to U.S. 62/050,210, filed Sep. 15, 2014, the contents of which are hereby expressly incorporated by reference in their entirety.

COMMON OWNERSHIP UNDER JOINT RESEARCH AGREEMENT 35 U.S.C. 102(C)

The subject matter disclosed in this Application was developed, and the claimed invention was made by, or on behalf of, one or more parties to a Joint Research Agreement that was in effect on or before the effective filing date of the claimed invention. The parties to the Joint Research Agreement are as follows: BASF SE and The Procter and Gamble Company.

This invention relates to salts of etheramines and polymeric acid, in particular on salts of etheramines and polycarboxylic acid. The hydrophobic etheramine contains at least two propylene oxide units and/or at least two butylene oxide units.

Due to the increasing popularity of easy-care fabrics made of synthetic fibers as well as the ever increasing energy costs and growing ecological concerns of detergent users, the once popular hot water wash has now taken a back seat to washing fabrics in cold water. Many commercially available laundry detergents are even advertised as being suitable for washing fabrics at 40° C. or 30° C. or even at room temperature. To achieve satisfactory washing result at such low temperatures, results comparable to those obtained with hot water washes, the demands on low-temperature detergents are especially high.

It is known to include certain additives in detergent compositions to enhance the detergent power of conventional surfactants so as to improve the removal of grease stains at temperatures of 60° C. and below.

WO 2004/020506 A2 discloses polyamine compositions prepared via alkoxylation of starting materials which may consist of 1,2-glycols, such as ethylene glycol and propylene glycol or higher diols such as diethylene glycol or dipropylene glycol. The polyol thus obtained may be aminated. Such polyamine precursors are useful in the manufacture of epoxy resins.

U.S. Pat. No. 6,437,055 B1 reads on curable coating compositions comprising a polyoxyalkylene polyamine containing a repetitive dialcohol core unit.

Additionally, U.S. Pat. No. 3,654,370 describes polyoxyalkylene polyamine prepared by the addition of ethylene oxide, propylene oxide or mixtures thereof to ethylene glycol, propylene glycol, glycerine or trimethylolpropane.

Such polyetheramines are liquid at room temperature and do not crystallize. For incorporating these products in solid detergents, such as powders or granules, or for shipping, solid ingredients may be advantageous.

Polytherdiamines based on propoxylated or butoxylated diols can be protonated with inorganic or organic acids like hydrochloric acid, sulfuric acid, acetic acid, lactic acid, phosphoric acid etc., but the formed ammonium salts do not crystallize.

Salts of polyetheramines formed with non-polymeric acids are described in WO2004007897. These salts are used as shale hydrating inhibitors.

WO2011068658 claims reaction products from polymeric acid and hydrophilic amine. The hydrophilic amine is described as polyether monoamine with a ratio of ethylene oxide to propylene oxide from 58:8 to 19:3. Polymeric acids are described as copolymers from acrylic acid and maleic acid. The use of the reactions products from polymeric acid and polyether monoamine are aqueous dispersions of inorganic pigments.

It was thus an object of the present invention to provide an etheramine in form of a powder or of a granule, which would render the shipping of such material easier as well as simplify the production process of solid detergents.

It was now surprisingly found that a salt of a hydrophobic etheramine and of a polymeric acid, wherein the hydrophobic etheramine contains at least two propylene oxide units and/or at least two butylene oxide units, is solid at room temperature and forms white, amorphous powders and can be used to formulate powder or granulated detergents.

As used herein, the term "hydrophobic polyetheramine" means that the sum of propylene oxide units and butylene oxide units in the polyol prior to the amination reaction is higher than the number of ethylene oxide units. In the narrow sense this means compounds which are free or substantially free of ethylene oxide units.

Preferably the hydrophobic etheramines do not contain ethylene oxide units. Preferably the etheramine is an etherdiamine or an ethertriamine.

The etheramine can be partially or preferably fully neutralized with the polymeric acid.

In one embodiment of the present invention, the hydrophobic etheramine is an etheramine of formula (I) or formula (II),

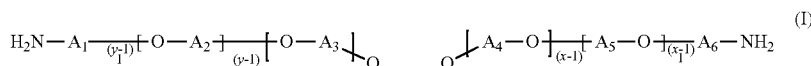

(I)

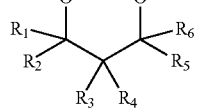

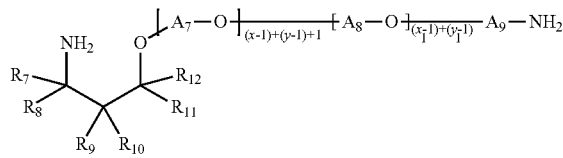

(II)

or a mixture of etheramines of formula (I) and formula (II), wherein $R_1$-$R_{12}$ are independently selected from H, alkyl, cycloalkyl, aryl, alkylaryl, or arylalkyl, at least one of $R_1$-$R_6$ and at least one of $R_7$-$R_{12}$ is different from H, $A_1$-$A_9$ are independently from each other linear or branched propylene or linear or branched butylene, the sum of x+y is in the range of from 2 to 200, x≥1 and y≥1, and $x_1$+$y_1$ is in the range of from 2 to 200, $x_1$≥1 and $y_1$≥1.

The hydrophobic etheramine is free or is substantially free of ethylene oxide units.

Preferably at least one of $A_1$ to $A_6$ and at least one of A7 to $A_9$ is propylene, even more preferably all of $A_1$ to $A_9$ are linear or branched propylene.

Preferably, the sum of x and y is in the range of from 3 to 8, more preferably in the range of from 4 to 6. Preferably, the sum of $x_1$ and $y_1$ is in the range of from 3 to 8, more preferably in the range of from 4 to 6.

Preferably, in Formula (I) or (II), $R_1$, $R_2$, $R_5$, $R_6$, $R_7$, $R_8$, $R_{11}$, and $R_{12}$ are H and $R_3$, $R_4$, $R_9$, and $R_{10}$ are independently selected from a butyl group, an ethyl group, a methyl group, a propyl group, a pentyl group or a phenyl group.

Even more preferably, in Formula (I) or (II), $R_3$ and $R_9$ are each an ethyl group, $R_1$, $R_2$, $R_5$, $R_6$, $R_7$, $R_8$, $R_{11}$, and $R_{12}$ are each H, R4 and R10 are each a butyl group.

The polyetheramine of Formula (I) or Formula (II) has a weight average molecular weight of about 290 to about 1000 grams/mole, preferably, of about 300 to about 700 grams/mole, even more preferably of about 300 to about 500 grams/mole.

In a preferred embodiment the polymeric acid is a homopolymer of a carboxylic acid or a copolymer of acrylic acid and maleic acid. The polymeric acid can be partly neutralized, e.g. with sodium hydroxide and therefore the polymer can also contain sodium salts of carboxylic acid groups. Preferably polymeric acid is a polyacrylic acid with a molecular weight Mn of from 1000 g/mol to 1 000 000 g/mol as determined by gel permeation chromatography and referring to the free acid. In another embodiment, polymeric acid is a copolymer of acrylic acid and maleic acid with a molecular weight of from 1000 g/mol to 1000 000 g/mol.

The salt of a hydrophobic etheramine and of a polymeric acid is obtainable by a process comprising the following steps:
a) the reaction of 1,3-diols of formula (III) with propylene oxide and/or butylene oxide, wherein the molar ratio of 1,3-diol to propylene oxide and/or butylene oxide is in the range of 1:2 to 1:10,

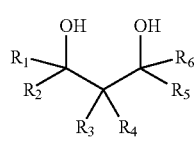

(III)

with $R_1$-$R_6$ are independently of one another H, alkyl, cycloalkyl, aryl, alkylaryl, arylalkyl and at least one group selected from $R_1$-$R_6$ is different from H (compound A),
b) the amination of the alkoxylated 1,3-diols (compound A) with ammonia in the presence of a catalysator (compound B),
c) the mixing of compound B to an aqueous solution of a polymeric acid at 25° C., wherein the molar ratio of the polycarboxylic acid groups to amino groups in compound B lies in the range of 100:1 to 1:1,
d) the removal of the water from the aqueous solution by spray-drying or spray granulation using a gas with an inlet temperature of at least 125° C. In another embodiment the water is removed via distillation, preferably under reduced pressure. In another embodiment a portion of the water is removed before the distillation via a phase separation. Optionally the resulting solid is milled.

In a preferred embodiment the molar ratio of 1,3-diol to propylene oxide and/or butylene oxide is in the range of 1:3 to 1:8, even more preferably in the range of 1:4 to 1:6.

Preferably in the 1,3-diol of Formula (III) $R_1$, $R_2$, $R_5$, $R_6$ are H and $R_3$, $R_4$ are C1-16 alkyl or aryl. The 1,3-diol of Formula (III) is preferably selected from the group consisting of 2-butyl-2-ethyl-1,3-propanediol, 2-methyl-2-propyl-1,3-propanediol, 2-methyl-2-phenyl-1,3-propanediol, 2,2-dimethyl-1,3-propandiol, 2-ethyl-1,3-hexandiol, 2-pentyl-2-propyl-1,3-propanediol.

In another embodiment of the present invention, the hydrophobic etheramine is an etheramine of formula (IV),

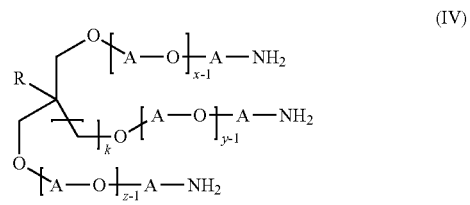

(IV)

wherein R=H or ethyl, k=0 or 1,

A represents linear or branched propylene and/or linear or branched butylene group, A may be the same as or different from one another, the sum of x, y and z lies in the range of 3 to 100, x≥1, y≥1 and z≥1.

The hydrophobic etheramine is free or is substantially free of ethylene oxide units.

In a preferred embodiment at least two A represent a linear or branched butylene group, preferably at least three A represent a linear or branched butylene group, in another preferred embodiment all A groups represent a linear or branched butylene group. Preferably the sum of x, y and z lies in the range of 3 to 30, even more preferably in the range of 3 to 10 and even more preferably in the range of 5 to 10.

The salt of a hydrophobic etheramine of formula (IV) and of a polymeric acid is obtainable by a process comprising the following steps:
a) the reaction of glycerine or 1,1,1-trimethylolpropane with butylene oxide and/or with propylene oxide, wherein the molar ratio of glycerine or 1,1,1-trimethylolpropane to butylene oxide and/or propylene oxide is in the range of 1:3 to 1:10 (compound C),
b) the amination of the alkoxylated glycerine or 1,1,1-trimethylolpropane (compound A) with ammonia in the presence of a catalysator (compound D),
c) the mixing of compound D to an aqueous solution of a polymeric acid at 25° C., wherein the molar ratio of the polycarboxylic acid groups to amino groups in compound B lies in the range of 100:1 to 1:1,
d) the removal of the water from the aqueous solution by spray-drying or spray granulation using a gas with an inlet temperature of at least 125° C. In another embodiment the water is removed via distillation, preferably under reduced pressure. In another embodiment a portion of the water is removed before the distillation via a phase separation. Optionally the resulting solid is milled.

In a preferred embodiment the molar ratio of glycerine or 1,1,1-trimethylolpropane to butylene oxide and/or propylene oxide is in the range of 1:3 to 1:6.

In another embodiment of the present invention, the hydrophobic etheramine is an etheramine of formula (V) or formula (VI),

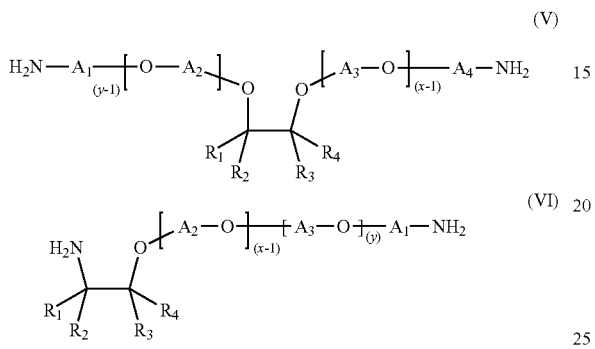

or a mixture of etheramines of formula (V) and formula (VI), wherein $R_1$, $R_2$, $R_3$ and $R_4$ are independently selected from the group consisting of H and a linear or branched alkyl group with 2 to 16 carbon atoms, $A_1$, $A_2$, $A_3$ and $A_4$ are independently selected from linear or branched propylene and/or linear or branched butylene, the sum of x+y is in the range of 2 to 100, and x≥1 and y≥1.

The hydrophobic etheramine is free or is substantially free of ethylene oxide units.

In one embodiment, $A_1$, $A_2$, $A_3$ and $A_4$ are propylene. Preferably $R_1$ is a linear alkyl group with 2 to 8 carbon atoms and $R_2$, $R_3$ and $R_4$ are hydrogens.

In another embodiment, $R_1$, $R_2$, $R_3$ and $R_4$ are independently selected from the group consisting of H, a methyl group and an ethyl group and $A_1$, $A_2$, $A_3$ and A4 are linear or branched butylene.

Preferably, the sum of x and y is in the range of from 3 to 8, more preferably in the range of from 4 to 6.

The etheramine of formula (V) or formula (VI) has a weight average molecular weight of about 250 to about 700 grams/mole, preferably, of about 270 to about 700 grams/mole, even more preferably of about 370 to about 570 grams/mole.

The salt of a hydrophobic etheramine and of a polymeric acid is obtainable by a process comprising the following steps:
a) the reaction of 1,2-dialcohols of Formula (VII) with propylene oxide and/or butylene oxide, wherein the molar ratio of 1,2-dialcohol to propylene oxide and/or butylene oxide is in the range of 1:2 to 1:100,

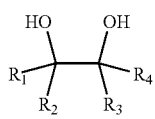

(VII)

wherein $R_1$, $R_2$, $R_3$ and $R_4$ are independently selected from the group consisting of H and a linear or branched alkyl group with 2 to 16 carbon atoms (compound E),
b) the amination of the alkoxylated 1,2-dialcohol (compound E) with ammonia in the presence of a catalysator (compound F),
c) the mixing of compound F to an aqueous solution of a polymeric acid at 25° C., wherein the molar ratio of the polycarboxylic acid groups to amino groups in compound B lies in the range of 100:1 to 1:1,
d) the removal of the water from the aqueous solution by spray-drying or spray granulation using a gas with an inlet temperature of at least 125° C. In another embodiment the water is removed via distillation, preferably under reduced pressure. In another embodiment a portion of the water is removed before the distillation via a phase separation. Optionally the resulting solid is milled.

In a preferred embodiment the molar ratio of dialcohol to propylene oxide and/or butylene oxide is in the range of 1:3 to 1:8, preferably in the range of 1:3 to 1:6 and even more preferably in the range of 1:3 to 1:4.

In one embodiment, $A_1$, $A_2$, $A_3$ and $A_4$ are propylene. Preferably $R_1$ is a linear alkyl group with 3 to 8 carbon atoms and $R_2$, $R_3$ and $R_4$ are hydrogens. In another embodiment, $R_1$ is a methyl group and $R_2$, $R_3$ and $R_4$ are H. In another preferred embodiment, $R_1$ is an ethyl group and $R_2$, $R_3$ and $R_4$ are H. In a further preferred embodiment, $R_1$ and $R_3$ are methyl groups and $R_2$ and $R_4$ are H.

The dialcohol of formula (VII) is preferably selected from the group consisting of 1,2-propanediol, 1,2-butanediol, 1,2-ethanediol, 3,4-hexanediol, 2,3-pentanediol. In another embodiment, the dialcohol of formula (VII) is preferably selected from the group consisting of 1,2-pentanediol, 1,2-hexanediol, 1,2-heptanediol, 1,2-octanediol, 1,2-nonanediol, 1,2-decanediol and 1,2-dodecanediol, 1,2-tetradecandiol, 1,2 hexadecandiol and 1,2 octadecandiol.

Step a): alkoxylation

Substituted 1,3 diols (formula III) are synthesized according WO10026030, WO10026066, WO09138387, WO09153193, WO10010075. Suitable 1,3-diols (Formula III) are for example: 2,2-dimethyl-1,3-propane diol, 2-butyl-2-ethyl-1,3-propane diol, 2-pentyl-2-propyl-1,3-propane diol, 2-(2-methyl)butyl-2-propyl-1,3-propane diol, 2,2,4-trimethyl-1,3-propane diol, 2,2-diethyl-1,3-propane diol, 2-methyl-2-propyl-1,3-propane diol, 2-ethyl-1,3-hexane diol, 2-phenyl-2-methyl-1,3-propane diol, 2-methyl-1,3-propane diol, 2-ethyl-2-methyl-1,3 propane diol, 2,2-dibutyl-1,3-propane diol, 2,2-di(2-methylpropyl)-1,3-propane diol, 2-isopropyl-2-methyl-1,3-propane diol, etc. Preferred 1,3-diols are 2-butyl-2-ethyl-1,3-propanediol, 2-methyl-2-propyl-1,3-propanediol, 2-methyl-2-phenyl-1,3-propanediol.

Compounds A, C and E are respectively obtained by reaction of dialcohols of formula (III), of glycerine or 1,1,1-trimethylolpropane, of dialcohols of formula (VII) with alkylene oxides and can be affected according to general alkoxylation procedures known in the art.

The molar ratio of molar ratio of dialcohols of formula (III) to propylene oxide and/or butylene oxide at which the alkoxylation reaction is carried out lies in the range of 1:2 to 1:10, preferably in the range of 1:3 to 1:8, even more preferably in the range of 1:4 to 1:6.

The molar ratio of glycerine or 1,1,1-trimethylolpropane to $C_4$-alkylene oxide and optionally propylene at which the alkoxylation reaction is carried out lies in the range of 1:3 to 1:10, preferably in the range of 1:3 to 1:6, even more preferably in the range of 1:5 to 1:10.

The molar ratio of molar ratio of dialcohols of formula (VII) to propylene oxide and/or butylene oxide at which the alkoxylation reaction is carried out lies in the range of 1:3 to 1:10, preferably in the range of 1:3 to 1:8, even more preferably in the range of 1:3 to 1:4.

This reaction is undertaken generally in the presence of a catalyst in an aqueous solution at a reaction temperature from about 70 to about 200° C. and preferably from about 80 to about 160° C. This reaction may be affected at a pressure of up to about 10 bar, and in particular up to about 8 bar.

Examples of suitable catalysts are basic catalysts such as alkali metal and alkaline earth metal hydroxides such as sodium hydroxide, potassium hydroxide and calcium hydroxide, alkali metal alkoxides, in particular sodium and potassium $C_1$-$C_4$-alkoxides, such as sodium methoxide, sodium ethoxide and potassium tert-butoxide, alkali metal and alkaline earth metal hydrides such as sodium hydride and calcium hydride, and alkali metal carbonates such as sodium carbonate and potassium carbonate. Preference is given to alkali metal hydroxides, particular preference being given to potassium hydroxide and sodium hydroxide. Typical use amounts for the base are from 0.05 to 10% by weight, in particular from 0.1 to 2% by weight, based on the total amount of polyalkyleneimine and alkylene oxide.

Step b): amination

The amination is carried out in the presence of copper-, nickel- and cobalt-containing catalyst.

The catalytically active material of the catalysts, before the reduction thereof with hydrogen, comprises oxygen compounds of aluminum, of copper, of nickel and of cobalt, and is in the range from 0.2 to 5.0% by weight of oxygen compounds of tin, calculated as SnO.

Compounds B, D or F are obtained by reductive amination of compound A, C or E with ammonia in presence of hydrogen and a catalyst containing nickel. Suitable catalysts are described in WO 2011/067199 A1 and in WO2011/067200 A1, and in EP0696572 B1. Preferred catalysts are supported copper-, nickel- and cobalt-containing catalysts, wherein the catalytically active material of the catalysts, before the reduction thereof with hydrogen, comprises oxygen compounds of aluminium, of copper, of nickel and of cobalt, and in the range from 0.2 to 5.0% by weight of oxygen compounds of tin, calculated as SnO. Other preferred catalysts are supported copper-, nickel- and cobalt-containing catalysts, wherein the catalytically active material of the catalysts, before the reduction thereof with hydrogen, comprises oxygen compounds of aluminium, of copper, of nickel, of cobalt and of tin, and in the range from 0.2 to 5.0% by weight of oxygen compounds of yttrium, of lanthanum, of cerium and/or of hafnium, each calculated as $Y_2O_3$, $La_2O_3$, $Ce_2O_3$ and $Hf_2O_3$ respectively. Another preferred catalyst is a zirconium, copper, nickel catalyst, wherein the catalytically active composition comprises from 20 to 85% by weight of oxygen-containing zirconium compounds, calculated as ZrO2, from 1 to 30% by weight of oxygen-containing compounds of copper, calculated as CuO, from 30 to 70% by weight of oxygen-containing compounds of nickel, calculated as NiO, from 0.1 to 5% by weight of oxygen-containing compounds of aluminium and/or manganese, calculated as Al2O3 and MnO2 respectively.

For the reductive amination step as well supported as non-supported catalyst can be used. The supported catalyst e.g. is obtained by deposition of the metallic components of the catalyst compositions onto support materials known to those skilled in the art, using techniques which are well-known in the art including without limitation, known forms of alumina, silica, charcoal, carbon, graphite, clays, mordenites; and molecular sieves, to provide supported catalysts as well. When the catalyst is supported, the support particles of the catalyst may have any geometric shape, for example the shape of spheres, tablets or cylinders in a regular or irregular version.

The process can be carried out in a continuous or discontinuous mode, e.g. a stirred tank reactor or tube reactor, and in particular a fixed-bed reactor. The reactor design is also not narrowly critical. The feed thereto may be upflowing or downflowing, and design features in the reactor which optimize plug flow in the reactor may be employed.

Byproducts which contain secondary or tertiary amino functions may be formed under amination reaction conditions. Secondary amines are e.g. obtained from a reaction of a fully or partially aminated diol with another fully and/or partially aminated diol. Tertiary amines are formed e.g. via a reaction of a secondary amine with another fully or partially aminated diol.

The degree of amination is between 50 to 100%, preferably from 60 to 100% and more preferably from 70-100% and even more preferably from 90 to 100%.

The degree of amination is calculated from the total amine value (AZ) divided by sum of the total acetylables value (AC) and tertiary amine value (tert. AZ) multiplicated by 100: (Total AZ: (AC+tert. AZ)×100).

The total amine value (AZ) is determined according to DIN 16945.

The total acetylables value (AC) is determined according to DIN 53240.

The secondary and tertiary amine are determined according to ASTM D2074-07.

The hydroxyl value is calculated from (total acetylables value+tertiary amine value)–total amine value.

Step c): Addition of polymeric acid to the etheramine

The etheramine (compound B, D or F) is mixed to an aqueous solution of a polycarboxylic acid at 25° C., wherein the molar ratio of the polymeric acid groups to amino groups in compound B, D or F lies in the range of 100:1 to 1:1, preferably in the range of 10:1 to 2:1.

In a preferred embodiment the polymeric acid is a homopolymer of a carboxylic acid or a copolymer of acrylic acid and maleic acid. Preferably polymeric acid is a polyacrylic acid with a molecular weight Mn of from 1000 g/mol to 1000 000 g/mol as determined by gel permeation chromatography and referring to the free acid. In another embodiment, polymeric acid is a copolymer of acrylic acid and maleic acid with a molecular weight of from 1000 g/mol to 1000 000 g/mol.

Mixing of the etheramine (compound A, C or F) and the polymeric acid is performed in the presence of water. Said mixing can be conducted in a way that an aqueous solution of the polymeric acid and an aqueous solution or emulsion of the etheramine (compound A, C or F) are being combined in a vessel, preferably under stirring. In a preferred embodiment, a solution of the polymeric acid is provided at ambient temperature, and etheramine (compound A, C or F) is being added as a solution.

In one embodiment of the present invention, the total solids content of such solution formed as result of the mixing lies in the range of from 10 to 90%.

In one embodiment of the present invention, such solution or slurry formed as result of the mixing has a pH value in the range of from 3 to 9, preferably from 5 to 8 and even more preferably from 6 to 8.

Mixing may be performed with mechanical support, for example shaking or stirring.

Step d) Removal of water

In step d), a spray-drying or spray granulation is performed, using a gas with an inlet temperature of at least 125° C. Said gas, hereinafter also being referred to as "hot gas", may be nitrogen, a rare gas or preferably air. In the course of step d), most of the water present in the solution after step c) will be removed, for example at least 55%, preferably at least 65% of the water. In one embodiment of the present invention, 99% of the water at most will be removed.

In one embodiment of the present invention, a drying vessel, for example a spray chamber or a spray tower, is being used in which a spray-granulating process is being performed by using a fluidized bed. Such a drying vessel is charged with a fluidized bed of a solid mixture of the etheramine (compound A, C or F) and the polymeric acid, obtained by any drying method such as spray drying or evaporation crystallization, and a solution of the etheramine (compound A, C or F) and the polymeric acid is sprayed onto or into such fluidized bed together with a hot gas stream The hot gas inlet stream may have a temperature in the range of from 125 to 350° C., preferably 160 to 220° C.

In one embodiment of the present invention, the fluidized bed may have a temperature in the range of from 80 to 150° C., preferably 100 to 120° C.

Spraying is being performed through one or more nozzles per drying vessel. Suitable nozzles are, for example, high-pressure rotary drum atomizers, rotary atomizers, single-fluid nozzles and two-fluid nozzles, two-fluid nozzles and rotary atomizers being preferred. The first fluid is the solution obtained after step c), the second fluid is compressed gas, for example with a pressure of 1.1 to 7 bar.

In one embodiment of the present invention, the droplets formed during the spray-granulating have an average diameter in the range of from 10 to 500 µm, preferably from 20 to 180 µm, even more preferably from 30 to 100 µm.

In one embodiment of the present invention, the off-gas departing the drying vessel may have a temperature in the range of from 40 to 140° C., preferably 80 to 110° C. but in any way colder than the hot gas stream. Preferably, the temperature of the off-gas departing the drying vessel and the temperature of the solid product present in the drying vessel are identical.

In another embodiment of the present invention, spray-granulation is being performed by performing two or more consecutive spray-drying processes, for example in a cascade of at least two spray dryers, for example in a cascade of at least two consecutive spray towers or a combination of a spray tower and a spray chamber, said spray chamber containing a fluidized bed. In the first dryer, a spray-drying process is being performed in the way as follows.

Spray-drying may be preferred in a spray dryer, for example a spray chamber or a spray tower. A solution obtained after step c) with a temperature preferably higher than ambient temperature, for example in the range of from 50 to 95° C., is introduced into the spray dryer through one or more spray nozzles into a hot gas inlet stream, for example nitrogen or air, the solution or slurry being converted into droplets and the water being vaporized. The hot gas inlet stream may have a temperature in the range of from 125 to 350° C.

The second spray dryer is charged with a fluidized bed with solid from the first spray dryer and solution or slurry obtained according to the above step is sprayed onto or into the fluidized bed, together with a hot gas inlet stream. The hot gas inlet stream may have a temperature in the range of from 125 to 350° C., preferably 160 to 220° C.

In one embodiment of the present invention, especially in a process for making an inventive granule, the average residence time of the etheramine (compound A, C or F) and the polymeric acid, respectively, in step d) is in the range of from 2 minutes to 4 hours, preferably from 30 minutes to 2 hours.

In one embodiment of the present invention, the pressure in the drying vessel in step d) is normal pressure ±100 mbar, preferably normal pressure±20 mbar, for example one mbar less than normal pressure.

In one embodiment of the present invention, one or more additives can be added to the solution obtained according to step c) before performing step d).

SYNTHESIS EXAMPLES

Example 1

2.5 g of a polyetheramine (2-Aminomethylethyl)-omega-(2-aminomethylethoxy)-poly(oxy (methyl-1,2-ethandiyl)), sold under the trade name Polyetheramine® D 230 (BASF) were added at room temperature to 10.0 g of a 50 wt % aqueous solution of a copolymer of acrylic acid and maleic acid. The copolymer of acrylic acid and maleic acid has an average molecular weight Mn of about 70000 g/mol (measured by gel permeation chromatography, calibrated with polystyrenesulfonate) and a molar ratio of acrylic acid to maleic acid of 4:1. The temperature was increased to 50° C. The mixture was stirred for additional 1 hour without external heating. Water was removed in vacuo (0.7 mbar). After milling, 4.5 g white odorless crystals were obtained. pH of a 10% solution in water:6.

Example 2

25.0 g of a polyetheramine (2-Aminomethylethyl)-omega-(2-aminomethylethoxy)-poly(oxy (methyl-1,2-ethandiyl)), sold under the trade name Polyetheramine® D 230 (BASF) were added at room temperature to 100.0 g of a 50 wt % aqueous solution of the sodium salt of a homopolymer of acrylic acid. The sodium salt of the homopolymer of acrylic acid has a molecular weight of about 4000 g/mol (measured by gel permeation chromatography, calibrated with polystyrenesulfonate). The temperature was increased to 41° C. The mixture was stirred for additional 2 hours at 60° C. Water was removed in vacuo (0.7 mbar). After milling, 70.0 g light yellow crystals were obtained. The pH of a 10% solution in water was 6.

Example 3

62.5 g of a polyetherdiamine from 2-butyl-2-ethyl-1,3-propandiol, alkoxylated with 2.0 mol propylene oxide per OH, and aminated (amine value 278.2 mg KOH/g) were added at room temperature to 250.0 g of a 50 wt % aqueous solution of a copolymer of acrylic acid and maleic acid. The copolymer of acrylic acid and maleic acid has a molecular weight of about 70000 g/mol (measured by gel permeation chromatography, calibrated with polystyrenesulfonate) and a molar ratio of acrylic acid to maleic acid of 4:1. The temperature was increased to 50° C. The mixture was stirred for additional 2 hours at 60° C. Water was removed in vacuo (0.7 mbar). After milling, 85.0 g white odorless crystals were obtained. The pH of a 10% solution in water was 6, water content: 0.9%.

Example 4

25.0 g of a polyetherdiamine from 2-butyl-2-ethyl-1,3-propandiol, alkoxylated with 2.0 mol propylene oxide per OH, and aminated (amine value 278.2 mg KOH/g) were added at room temperature to 100.0 g of a 50 wt % aqueous solution of the sodium salt of a homopolymer of acrylic acid. The sodium salt of the homopolymer of acrylic acid has a molecular weight of about 4000 g/mol (measured by gel permeation chromatography, calibrated with polystyrenesulfonate). The temperature was increased to 42° C. The mixture was stirred for additional 2 hours at 60° C. A two-phase system was obtained and the waterphase was discarded. The organic phase was dried at 60° C. under vacuum (0.7 mbar). After milling, 71.0 g white odorless crystals were obtained. The pH of a 10% solution in water was 4.1, water content: 0.9%.

Example 5

25 g of a polyetherdiamine from 2-butyl-2-ethyl-1,3-propandiol, alkoxylated with 2.0 mol propylene oxide per OH, and aminated (amine value 278.2 mg KOH/g) were added at room temperature to 100.0 g of a 50 wt % aqueous solution of a copolymer of acrylic acid and maleic acid. The copolymer of acrylic acid and maleic acid has a molecular weight of about 3000 g/mol (measured by gel permeation chromatography, calibrated with polystyrenesulfonate) and a molar ratio of acrylic acid to maleic acid of 1.7:1. The temperature was increased to 39° C. The mixture was stirred for additional 2 hours at 60° C. Water was removed in vacuo (0.7 mbar). After milling, 71.5 g sticky yellow crystals were obtained. The pH of a 10% solution in water was 3.5, water content: 0.9%.

APPLICATION EXAMPLES

The inventive salt of a hydrophobic polyetheramine and a polymeric acid may be used in cleaning compositions which may include from about 0.1% to about 10%, in some examples, from about 0.2% to about 5%, and in other examples, from about 0.5% to about 3%, by weight of the composition, of the salt according to the invention.

The cleaning composition comprises one or more surfactants. The cleaning composition comprises one or more surfactants in an amount sufficient to provide desired cleaning properties. The cleaning composition may comprise, by weight of the composition, from about 1% to about 70% of one or more surfactants. The detergent composition may comprise, by weight of the composition, from about 2% to about 60% of one or more surfactants. The detergent composition may comprise, by weight of the composition, from about 5% to about 30% of one or more surfactants. The surfactant may comprise a detersive surfactant selected from the group consisting of anionic surfactants, nonionic surfactants, cationic surfactants, zwitterionic surfactants, amphoteric surfactants, ampholytic surfactants, and mixtures thereof. Those of ordinary skill in the art will understand that a detersive surfactant encompasses any surfactant or mixture of surfactants that provide cleaning, stain removing, or laundering benefit to soiled material.

Anionic Surfactants

The one or more surfactants may consist essentially of, or even consist of, an anionic surfactants.

Specific, non-limiting examples of suitable anionic surfactants include any conventional anionic surfactant. This may include a sulfate detersive surfactant, for e.g., alkoxylated and/or non-alkoxylated alkyl sulfate materials, and/or sulfonic detersive surfactants, e.g., alkyl benzene sulfonates.

The cleaning composition may comprise a nonionic surfactant. In some examples, the cleaning composition comprises up to about 25%, by weight of the cleaning composition, of one or more nonionic surfactants, e.g., as a co-surfactant. In some examples, the cleaning composition comprises from about 0.1% to about 15%, by weight of the cleaning composition, of one or more nonionic surfactants. In further examples, the cleaning compositions comprise from about 0.3% to about 10%, by weight of the cleaning compositions, of one or more nonionic surfactants.

The surfactant system may comprise combinations of anionic and nonionic surfactant materials. In some examples, the weight ratio of anionic surfactant to nonionic surfactant is at least about 2:1. In other examples, the weight ratio of anionic surfactant to nonionic surfactant is at least about 5:1. In further examples, the weight ratio of anionic surfactant to nonionic surfactant is at least about 10:1.

The cleaning compositions of the invention may also contain adjunct cleaning additives. Suitable adjunct cleaning additives include builders, structurants or thickeners, clay soil removal/anti-redeposition agents, polymeric soil release agents, polymeric dispersing agents, polymeric grease cleaning agents, enzymes, enzyme stabilizing systems, bleaching compounds, bleaching agents, bleach activators, bleach catalysts, brighteners, dyes, hueing agents, dye transfer inhibiting agents, chelating agents, suds supressors, softeners, and perfumes.

Methods of Use

The present invention includes methods for cleaning soiled material. As will be appreciated by one skilled in the art, the cleaning compositions of the present invention are suited for use in laundry pretreatment applications, laundry cleaning applications, and home care applications. Such methods include, but are not limited to, the steps of contacting cleaning compositions in neat form or diluted in wash liquor, with at least a portion of a soiled material and then optionally rinsing the soiled material. The soiled material may be subjected to a washing step prior to the optional rinsing step.

For use in laundry pretreatment applications, the method may include contacting the cleaning compositions described herein with soiled fabric. Following pretreatment, the soiled fabric may be laundered in a washing machine or otherwise rinsed.

Machine laundry methods may comprise treating soiled laundry with an aqueous wash solution in a washing machine having dissolved or dispensed therein an effective amount of a machine laundry cleaning composition in accord with the invention. An "effective amount" of the cleaning composition means from about 20 g to about 300 g of product dissolved or dispersed in a wash solution of volume from about 5 L to about 65 L. The water temperatures may range from about 5° C. to about 100° C. The water to soiled material (e.g., fabric) ratio may be from about 1:1 to about 30:1. The compositions may be employed at concentrations of from about 500 ppm to about 15,000 ppm in solution. In the context of a fabric laundry composition, usage levels may also vary depending not only on the type and severity of the soils and stains, but also on the wash water temperature, the volume of wash water, and the type of washing machine (e.g., top-loading, front-loading, top-loading, vertical-axis Japanese-type automatic washing machine).

The cleaning compositions herein may be used for laundering of fabrics at reduced wash temperatures. These methods of laundering fabric comprise the steps of delivering a laundry cleaning composition to water to form a wash liquor and adding a laundering fabric to said wash liquor, wherein the wash liquor has a temperature of from about 0° C. to about 20° C., or from about 0° C. to about 15° C., or from about 0° C. to about 9° C. The fabric may be contacted to the water prior to, or after, or simultaneous with, contacting the laundry cleaning composition with water.

Another method includes contacting a nonwoven substrate impregnated with an embodiment of the cleaning composition with soiled material. As used herein, "nonwoven substrate" can comprise any conventionally fashioned nonwoven sheet or web having suitable basis weight, caliper (thickness), absorbency, and strength characteristics. Non-limiting examples of suitable commercially available nonwoven substrates include those marketed under the tradenames SON-TARA® by DuPont and POLYWEB® by James River Corp.

Hand washing/soak methods, and combined handwashing with semi-automatic washing machines, are also included.

Machine Dishwashing Methods

Methods for machine-dishwashing or hand dishwashing soiled dishes, tableware, silverware, or other kitchenware, are included. One method for machine dishwashing comprises treating soiled dishes, tableware, silverware, or other kitchenware with an aqueous liquid having dissolved or dispensed therein an effective amount of a machine dishwashing composition in accord with the invention. By an effective amount of the machine dishwashing composition it is meant from about 8 g to about 60 g of product dissolved or dispersed in a wash solution of volume from about 3 L to about 10 L.

One method for hand dishwashing comprises dissolution of the cleaning composition into a receptacle containing water, followed by contacting soiled dishes, tableware, silverware, or other kitchenware with the dishwashing liquor, then hand scrubbing, wiping, or rinsing the soiled dishes, tableware, silverware, or other kitchenware. Another method for hand dishwashing comprises direct application of the cleaning composition onto soiled dishes, tableware, silverware, or other kitchenware, then hand scrubbing, wiping, or rinsing the soiled dishes, tableware, silverware, or other kitchenware. In some examples, an effective amount of cleaning composition for hand dishwashing is from about 0.5 ml. to about 20 ml. diluted in water.

Packaging for the Compositions

The cleaning compositions described herein can be packaged in any suitable container including those constructed from paper, cardboard, plastic materials, and any suitable laminates. An optional packaging type is described in European Application No. 94921505.7.

Multi-Compartment Pouch Additive

The cleaning compositions described herein may also be packaged as a multi-compartment cleaning composition.

EXAMPLES

In the following examples, the individual ingredients within the detergent compositions are expressed as percentages by weight of the detergent compositions.

Example 1

|  | 1 (wt %) |
|---|---|
| Linear alkylbenzenesulfonate[1] | 8.2 |
| AE3S[2] | 1.9 |
| Zeolite A[3] | 1.8 |
| Citric Acid | 1.5 |
| Sodium Carbonate[5] | 29.7 |
| Silicate 1.6R ($SiO_2:Na_2O$)[4] | 3.4 |
| Soil release agent[6] | 0.2 |
| Acrylic Acid/Maleic Acid Copolymer[7] | 2.2 |
| Carboxymethylcellulose | 0.9 |
| Protease - Purafect ® (84 mg active/g)[9] | 0.08 |
| Amylase - Stainzyme Plus ® (20 mg active/g)[8] | 0.16 |
| Lipase - Lipex ® (18.00 mg active/g)[8] | 0.24 |
| Cellulase - Celluclean ™ (15.6 mg active/g)[8] | 0.1 |
| Salt of Polyetheramine and Polymeric Acid[10] | 2.0 |
| TAED [11] | 3.26 |
| Percarbonate[12] | 14.1 |
| Na salt of Ethylenediamine-N,N'-disuccinic acid, (S,S) isomer (EDDS)[13] | 2.19 |
| Hydroxyethane di phosphonate (HEDP)[14] | 0.54 |
| $MgSO_4$ | 0.38 |
| Perfume | 0.38 |
| Suds suppressor agglomerate[15] | 0.04 |
| Sulphonated zinc phthalocyanine (active)[16] | 0.0012 |
| Sulfate/Water & Miscellaneous | Balance |

[1]Linear alkylbenzenesulfonate having an average aliphatic carbon chain length $C_{11}-C_{12}$ supplied by Stepan, Northfield, Illinois, USA
[2]AE3S is $C_{12-15}$ alkyl ethoxy (3) sulfate supplied by Stepan, Northfield, Illinois, USA
[3]Zeolite A is supplied by Industrial Zeolite (UK) Ltd, Grays, Essex, UK
[4]1.6R Silicate is supplied by Koma, Nestemica, Czech Republic
[5]Sodium Carbonate is supplied by Solvay, Houston, Texas, USA
[6]Soil release agent is Repel-o-tex ® PF, supplied by Rhodia, Paris, France
[7]Acrylic Acid/Maleic Acid Copolymer is molecular weight 70,000 and acrylate:maleate ratio 70:30, supplied by BASF, Ludwigshafen, Germany
[8]Savinase ®, Natalase ®, Stainzyme ®, Lipex ®, Celluclean ™, Mannaway ® and Whitezyme ® are all products of Novozymes, Bagsvaerd, Denmark.
[9]Proteases may be supplied by Genencor International, Palo Alto, California, USA (e.g. Purafect Prime ®) or by Novozymes, Bagsvaerd, Denmark (e.g. Liquanase ®, Coronase ®).
[10]Salt of Polyetheramine and Polymeric Acid of synthesis Examples 3, 4, or 5.
[11]TAED is tetraacetylethylenediamine, supplied under the Peractive ® brand name by Clariant GmbH, Sulzbach, Germany
[12]Sodium percarbonate supplied by Solvay, Houston, Texas, USA
[13]Na salt of Ethylenediamine-N,N'-disuccinic acid, (S,S) isomer (EDDS) is supplied by Octel, Ellesmere Port, UK
[14]Hydroxyethane di phosphonate (HEDP) is supplied by Dow Chemical, Midland, Michigan, USA
[15]Suds suppressor agglomerate is supplied by Dow Corning, Midland, Michigan, USA
[16]Fluorescent Brightener 1 is Tinopal ® AMS, Fluorescent Brightener 2 is Tinopal ® CBS-X, Sulphonated zinc phthalocyanine and Direct Violet 9 is Pergasol ® Violet BN-Z all supplied by Ciba Specialty Chemicals, Basel, Switzerland Examples 2-7

Granular laundry detergent compositions designed for hand washing or top-loading washing machines may be added to sufficient water to form a paste for direct contact with the surface to be treated, forming a concentrated cleaning composition.

|  | 2 (wt %) | 3 (wt %) | 4 (wt %) | 5 (wt %) | 6 (wt %) | 7 (wt %) |
|---|---|---|---|---|---|---|
| Linear alkylbenzenesulfonate | 20 | 22 | 20 | 15 | 20 | 20 |
| $C_{12-14}$ Dimethylhydroxyethyl ammonium chloride | 0.7 | 0.2 | 1 | 0.6 | 0.0 | 0 |
| AE3S | 0.9 | 1 | 0.9 | 0.0 | 0.5 | 0.9 |
| AE7 | 0.0 | 0.0 | 0.0 | 1 | 0.0 | 3 |
| Sodium tripolyphosphate | 5 | 0.0 | 4 | 9 | 2 | 0.0 |
| Zeolite A | 0.0 | 1 | 0.0 | 1 | 4 | 1 |

-continued

|  | 2 (wt %) | 3 (wt %) | 4 (wt %) | 5 (wt %) | 6 (wt %) | 7 (wt %) |
|---|---|---|---|---|---|---|
| 1.6R Silicate (SiO$_2$:Na$_2$O at ratio 1.6:1) | 7 | 5 | 2 | 3 | 3 | 5 |
| Sodium carbonate | 25 | 20 | 25 | 17 | 18 | 19 |
| Polyacrylate MW 4500 | 1 | 0.6 | 1 | 1 | 1.5 | 1 |
| Random graft copolymer | 0.1 | 0.2 | 0.0 | 0.0 | 0.0 | 0.0 |
| Carboxymethyl cellulose | 1 | 0.3 | 1 | 1 | 1 | 1 |
| Stainzyme ® (20 mg active/g) | 0.1 | 0.2 | 0.1 | 0.2 | 0.1 | 0.1 |
| Bacterial protease (Savinase ® 32.89 mg active/g) | 0.1 | 0.1 | 0.1 | 0.1 |  | 0.1 |
| Natalase ® (8.65 mg active/g) | 0.1 | 0.0 | 0.1 | 0.0 | 0.1 | 0.1 |
| Lipex ® (18 mg active/g) | 0.03 | 0.07 | 0.3 | 0.1 | 0.07 | 0.4 |
| Biotouch ® ROC (20 mg active/g) | 0.1 | 0.2 | 0.2 | 0.2 | 0.1 | 0.4 |
| *Salt of Polyetheramine and Polymeric Acid | 2.0 | 3.0 | 2.0 | 2.0 | 3.0 | 2.0 |
| Fluorescent Brightener 1 | 0.06 | 0.0 | 0.06 | 0.18 | 0.06 | 0.06 |
| Fluorescent Brightener 2 | 0.1 | 0.06 | 0.1 | 0.0 | 0.1 | 0.1 |
| DTPA | 0.6 | 0.8 | 0.6 | 0.25 | 0.6 | 0.6 |
| MgSO$_4$ | 1 | 1 | 1 | 0.5 | 1 | 1 |
| Sodium Percarbonate | 0.0 | 5.2 | 0.1 | 0.0 | 0.0 | 0.0 |
| Sodium Perborate Monohydrate | 4.4 | 0.0 | 3.85 | 2.09 | 0.78 | 3.63 |
| NOBS | 1.9 | 0.0 | 1.66 | 0.0 | 0.33 | 0.75 |
| TAED | 0.58 | 1.2 | 0.51 | 0.0 | 0.015 | 0.28 |
| Sulphonated zinc phthalocyanine | 0.0030 | 0.0 | 0.0012 | 0.0030 | 0.0021 | 0.0 |
| S-ACMC | 0.1 | 0.0 | 0.0 | 0.0 | 0.06 | 0.0 |
| Direct Violet 9 | 0.0 | 0.0 | 0.0003 | 0.0005 | 0.0003 | 0.0 |
| Acid Blue 29 | 0.0 | 0.0 | 0.0 | 0.0 | 0.0 | 0.0003 |
| Sulfate/Moisture | | | | Balance | | |

Examples 8-13

Granular laundry detergent compositions designed for front-loading automatic washing machines may be added to sufficient water to form a paste for direct contact with the surface to be treated, forming a concentrated cleaning compostion.

|  | 8 (wt %) | 9 (wt %) | 10 (wt %) | 11 (wt %) | 12 (wt %) | 13 (wt %) |
|---|---|---|---|---|---|---|
| Linear alkylbenzenesulfonate | 8 | 7.1 | 7 | 6.5 | 7.5 | 7.5 |
| AE3S | 0 | 4.8 | 0 | 5.2 | 4 | 4 |
| C12-14 Alkylsulfate | 1 | 0 | 1 | 0 | 0 | 0 |
| AE7 | 2.2 | 0 | 3.2 | 0 | 0 | 0 |
| C$_{10-12}$ Dimethyl hydroxyethylammonium chloride | 0.75 | 0.94 | 0.98 | 0.98 | 0 | 0 |
| Crystalline layered silicate (δ-Na$_2$Si$_2$O$_5$) | 4.1 | 0 | 4.8 | 0 | 0 | 0 |
| Zeolite A | 5 | 0 | 5 | 0 | 2 | 2 |
| Citric Acid | 3 | 5 | 3 | 4 | 2.5 | 3 |
| Sodium Carbonate | 15 | 20 | 14 | 20 | 23 | 23 |
| Silicate 2R (SiO$_2$:Na$_2$O at ratio 2:1) | 0.08 | 0 | 0.11 | 0 | 0 | 0 |
| *Salt of Polyetheramine and Polymeric Acid | 2.0 | 3.0 | 2.0 | 3.0 | 3.0 | 2.0 |
| Soil release agent | 0.75 | 0.72 | 0.71 | 0.72 | 0 | 0 |
| Acrylic Acid/Maleic Acid Copolymer | 1.1 | 3.7 | 1.0 | 3.7 | 2.6 | 3.8 |
| Carboxymethylcellulose | 0.15 | 1.4 | 0.2 | 1.4 | 1 | 0.5 |
| Bacterial protease (84 mg active/g) | 0.2 | 0.2 | 0.3 | 0.15 | 0.12 | 0.13 |
| Stainzyme ® (20 mg active/g) | 0.2 | 0.15 | 0.2 | 0.3 | 0.15 | 0.15 |
| Lipex ® (18.00 mg active/g) | 0.05 | 0.15 | 0.1 | 0 | 0 | 0 |
| Natalase ® (8.65 mg active/g) | 0.1 | 0.2 | 0 | 0 | 0.15 | 0.15 |
| Celluclean ™ (15.6 mg active/g) | 0 | 0 | 0 | 0 | 0.1 | 0.1 |
| Biotouch ® ROC (20 mg active/g) | 0.2 | 0.1 | 0.2 | 0.2 | 0.2 | 0.2 |
| TAED | 3.6 | 4.0 | 3.6 | 4.0 | 2.2 | 1.4 |
| Percarbonate | 13 | 13.2 | 13 | 13.2 | 16 | 14 |

|  | 8 (wt %) | 9 (wt %) | 10 (wt %) | 11 (wt %) | 12 (wt %) | 13 (wt %) |
|---|---|---|---|---|---|---|
| Na salt of Ethylenediamine-N,N'-disuccinic acid, (S,S) isomer (EDDS) | 0.2 | 0.2 | 0.2 | 0.2 | 0.2 | 0.2 |
| Hydroxyethane di phosphonate (HEDP) | 0.2 | 0.2 | 0.2 | 0.2 | 0.2 | 0.2 |
| MgSO$_4$ | 0.42 | 0.42 | 0.42 | 0.42 | 0.4 | 0.4 |
| Perfume | 0.5 | 0.6 | 0.5 | 0.6 | 0.6 | 0.6 |
| Suds suppressor agglomerate | 0.05 | 0.1 | 0.05 | 0.1 | 0.06 | 0.05 |
| Soap | 0.45 | 0.45 | 0.45 | 0.45 | 0 | 0 |
| Sulphonated zinc phthalocyanine (active) | 0.0007 | 0.0012 | 0.0007 | 0 | 0 | 0 |
| S-ACMC | 0.01 | 0.01 | 0 | 0.01 | 0 | 0 |
| Direct Violet 9 (active) | 0 | 0 | 0.0001 | 0.0001 | 0 | 0 |
| Sulfate/Water & Miscellaneous | Balance | | | | | |

Raw Materials and Notes for Composition Examples 2-13

*Salt of Polyetheramine and Polymeric Acid of synthesis Examples 3, 4, or 5.

Linear alkylbenzenesulfonate having an average aliphatic carbon chain length $C_{11}$-$C_{12}$ supplied by Stepan, Northfield, Ill., USA $C_{12-14}$ Dimethylhydroxyethyl ammonium chloride, supplied by Clariant GmbH, Sulzbach, Germany AE3S is C12-15 alkyl ethoxy (3) sulfate supplied by Stepan, Northfield, Ill., USA AE7 is C12-15 alcohol ethoxylate, with an average degree of ethoxylation of 7, supplied by Huntsman, Salt Lake City, Utah, USA AE9 is $C_{12-13}$ alcohol ethoxylate, with an average degree of ethoxylation of 9, supplied by Huntsman, Salt Lake City, Utah, USA HSAS is a mid-branched primary alkyl sulfate with carbon chain length of about 16-17 Sodium tripolyphosphate is supplied by Rhodia, Paris, France Zeolite A is supplied by Industrial Zeolite (UK) Ltd, Grays, Essex, UK 1.6R Silicate is supplied by Koma, Nestemica, Czech Republic Sodium Carbonate is supplied by Solvay, Houston, Tex., USA Polyacrylate MW 4500 is supplied by BASF, Ludwigshafen, Germany Carboxymethyl cellulose is Finnfix® V supplied by CP Kelco, Arnhem, Netherlands Suitable chelants are, for example, diethylenetetraamine pentaacetic acid (DTPA) supplied by Dow Chemical, Midland, Mich., USA or Hydroxyethane di phosphonate (HEDP) supplied by Solutia, St Louis, Miss., USA Bagsvaerd, Denmark Savinase®, Natalase®, Stainzyme®, Lipex®, Celluclean™, Mannaway® and Whitezyme® are all products of Novozymes, Bagsvaerd, Denmark.

Biotouch® ROC is a product of AB Enzymes, Darmstadt, Germany.

Bacterial protease (examples 8-13) described in U.S. Pat. No. 6,312,936 B1 supplied by Genencor International, Palo Alto, Calif., USA Bacterial protease (examples 14-20) described in U.S. Pat. No. 4,760,025 is supplied by Genencor International, Palo Alto, Calif., USA Fluorescent Brightener 1 is Tinopal® AMS, Fluorescent Brightener 2 is Tinopal® CBS-X, Sulphonated zinc phthalocyanine and Direct Violet 9 is Pergasol® Violet BN-Z all supplied by Ciba Specialty Chemicals, Basel, Switzerland Sodium percarbonate supplied by Solvay, Houston, Tex., USA Sodium perborate is supplied by Degussa, Hanau, Germany NOBS is sodium nonanoyloxybenzenesulfonate, supplied by Future Fuels, Batesville, Ark., USA TAED is tetraacetylethylenediamine, supplied under the Peractive® brand name by Clariant GmbH, Sulzbach, Germany S-ACMC is carboxymethylcellulose conjugated with C. I. Reactive Blue 19, sold by Megazyme, Wicklow, Ireland under the product name AZO-CM-CELLULOSE, product code S-ACMC.

Soil release agent is Repel-o-tex® PF, supplied by Rhodia, Paris, France

Acrylic Acid/Maleic Acid Copolymer is molecular weight 70,000 and acrylate:maleate ratio 70:30, supplied by BASF, Ludwigshafen, Germany Na salt of Ethylenediamine-N,N'-disuccinic acid, (S,S) isomer (EDDS) is supplied by Octel, Ellesmere Port, UK Hydroxyethane di phosphonate (HEDP) is supplied by Dow Chemical, Midland, Mich., USA Suds suppressor agglomerate is supplied by Dow Corning, Midland, Mich., USA HSAS is mid-branched alkyl sulfate as disclosed in U.S. Pat. Nos. 6,020,303 and 6,060,443

$C_{12-14}$ dimethyl Amine Oxide is supplied by Procter & Gamble Chemicals, Cincinnati, Ohio, USA Liquitint® Violet CT is supplied by Milliken, Spartanburg, S.C., USA.

Example 14: Multiple Compartment Unit Dose Compositions

Multiple compartment unit dose laundry detergent formulations of the present invention are provided below. In these examples the unit dose has three compartments, but similar compositions can be made with two, four or five compartments. The film used to encapsulate the compartments is polyvinyl alcohol.

| Base Composition 1 | % |
|---|---|
| Ingredients | |
| Glycerol | 5.3 |
| 1,2-propanediol | 10.0 |
| Citric Acid | 0.5 |
| Monoethanolamine | 10.0 |
| Caustic soda | — |

-continued

| Base Composition 1 | % |
|---|---|
| Hydroxyethane diphosphonic acid | 1.1 |
| Potassium sulfite | 0.2 |
| Nonionic Marlipal C24EO$_7$ | 20.1 |
| HLAS | 24.6 |
| Fluorescent Brightener 2 | 0.2 |
| C12-15 Fatty acid | 16.4 |
| A compound having the following general structure: bis(($C_2H_5O$)($C_2H_4O$)n)($CH_3$)—$N^+$—$C_xH_{2x}$—$N^+$—($CH_3$)-bis(($C_2H_5O$)($C_2H_4O$)n), wherein n = from 20 to 30, and x = from 3 to 8, or sulphated or sulphonated variants thereof | 2.9 |
| Polyethyleneimine ethoxylate PEI600 E20 | 1.1 |
| MgCl$_2$ | 0.2 |
| Solvents (1,2 propanediol, ethanol) | To 100% |

Multi-Compartment Formulations

| | Composition | | | | | |
|---|---|---|---|---|---|---|
| | 1 | | | 2 | | |
| | Compartment | | | | | |
| | A | B | C | A | B | C |
| Volume of each compartment | 40 ml | 5 ml | 5 ml | 40 ml | 5 ml | 5 ml |
| Active material in Wt. % | | | | | | |
| Perfume | 1.6 | 1.6 | | 1.6 | 1.6 | |
| Dyes | <0.01 | <0.01 | | <0.01 | <0.01 | |
| TiO2 | 0.1 | — | | — | 0.1 | |
| Sodium Sulfite | 0.4 | 0.4 | | 0.3 | 0.3 | |
| Salt of Polyetheramine and Polymeric Acid[1] | | | 4-40% | | | 4-40% |
| Acusol 305, Rohm&Haas | 1.2 | | | 2 | | |
| Hydrogenated castor oil | 0.14 | 0.14 | | 0.14 | 0.14 | |
| Solid non-active filler[2] | | | Add to 100% | | | Add to 100% |
| Base Composition 1 | Add to 100% | Add to 100% | | Add to 100% | Add to 100% | Add to 100% |

[1]Salt of Polyetheramine and Polymeric Acid of synthesis Examples 3, 4, or 5.
[2]Solid non-active fillers include sodium sulfate, silica, silicates, zeolite.

The invention claimed is:

1. A salt of a hydrophobic etheramine and of a polymeric acid, wherein the hydrophobic etheramine is selected from the group consisting of an etheramine of formula (I), an etheramine of formula (II),

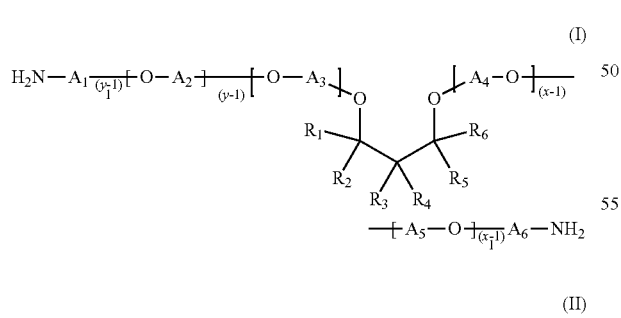

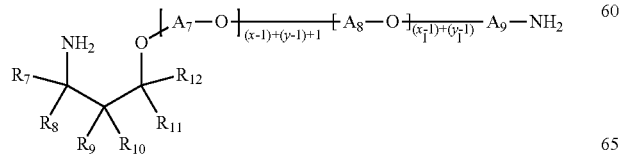

and a mixture of etheramines of formula (I) and formula (II), and wherein $R_1$-$R_{12}$ are independently selected from H, alkyl, cycloalkyl, aryl, alkylaryl, or arylalkyl, at least one of $R_1$—$R_6$ and at least one of $R_7$-$R_{12}$ is different from H,
$A_1$-$A_9$ are independently from each other linear or branched propylene or linear or branched butylene,
the sum of x+y is in the range of from 2 to 200,
x≥1 and y≥1,
and $x_1+y_1$ is in the range of from 2 to 200, $x_1$≥1 and $y_1$≥1.

2. The salt according to claim 1, wherein each of $A_1$-$A_9$ is one of a linear or a branched propylene.

3. The salt according to claim 1, wherein $R_3$ and $R_9$ are each an ethyl group, $R_1$, $R_2$, $R_5$ $R_6$, $R_7$, $R_8$, $R_{11}$, $R_{12}$ are each H, and $R_4$ and $R_{10}$ are each a butyl group.

4. The salt according to claim 1, wherein the polymeric acid is a polyacrylic acid with a molecular weight (Mw) of from 1,000 g/mol to 1,000,000 g/mol determined by gel permeation chromatography and referring to the free acid.

5. The salt according to claim 1, wherein the polymeric acid is a copolymer of acrylic acid and maleic acid with a molecular weight of from 1,000 g/mol to 1,000,000 g/mol.

6. A salt of a hydrophobic etheramine and of a polymeric acid, wherein the hydrophobic etheramine is an etheramine of formula (IV),

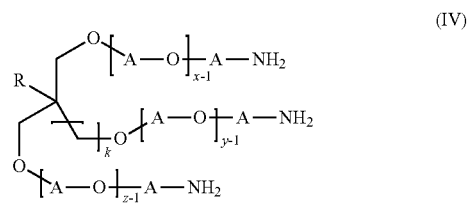

wherein R=H or ethyl, k=0 or 1, A represents at least one of (a) one of a linear or a branched propylene and (b) one of a linear or a branched butylene group, wherein A may be the same as or different from one another, the sum of x, y and z lies in the range of 3 to 100, x≥1, y≥1 and z≥1.

7. A salt of a hydrophobic etheramine and of a polymeric acid, wherein the hydrophobic etheramine is selected from the group consisting of an etheramine of formula (V), an etheramine of formula (VI),

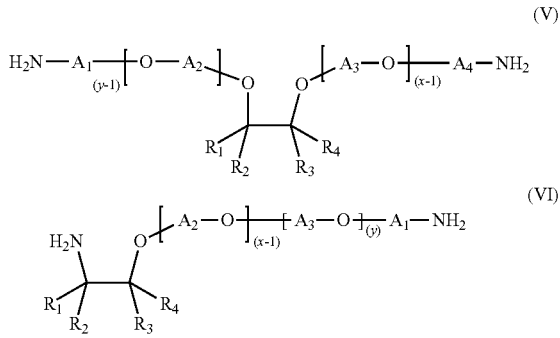

and a mixture of etheramines of formula (V) and formula (VI) and wherein $R_1$, $R_2$, $R_3$ and $R_4$ are independently selected from the group consisting of H and one of a linear or branched alkyl group with 2 to 16 carbon atoms; $A_1$, $A_2$, $A_3$ and $A_4$ are independently selected from at least one of (a) a linear or branched propylene and (b) one of a linear or branched butylene, the sum of x+y is in the range of 2 to 100 and x≥1 and y≥1.

8. The salt according to claim 7, wherein $A_1$, $A_2$, $A_3$ and $A_4$ are propylene.

9. The salt according to claim 7, wherein $R_1$ is a linear alkyl group with 2 to 8 carbon atoms and $R_2$, $R_3$ and $R_4$ are hydrogens.

10. The salt according to claim 7, wherein $R_1$, $R_2$, $R_3$ and $R_4$ are independently selected from the group consisting of H, a methyl group and an ethyl group and $A_1$, $A_2$, $A_3$ and $A_4$ are one of linear or branched butylene.

11. The salt according to claim 10, wherein the polymeric acid is one of a homopolymer of a carboxylic acid or a copolymer of acrylic acid and maleic acid.

12. A salt of a hydrophobic etheramine and of a polymeric acid obtainable by a process comprising the following steps:
a) the reaction of 1,3-diols of formula (III) with at least one of propylene oxide and butylene oxide, wherein the molar ratio of 1,3-diol to propylene oxide and/or butylene oxide is in the range of 1:2 to 1:10,

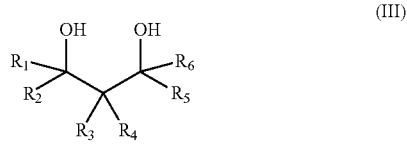

with $R_1$-$R_6$ are independently of one another H, alkyl, cycloalkyl, aryl, alkylaryl, arylalkyl and at least one group selected from $R_1$-$R_6$ is different from H (compound A),
b) the amination of the alkoxylated 1,3-diols (compound A) with ammonia in the presence of a catalysator (compound B),
c) the mixing of compound B to an aqueous solution of a polymeric acid at 25° C., wherein the molar ratio of the polycarboxylic acid groups to amino groups in compound B lies in the range of 100:1 to 1:1,
d) the removal of the water from the aqueous solution by one of spray-drying using a gas with an inlet temperature of at least 125° C. spray granulation using a gas with an inlet temperature of at least 125° C. distillation under reduced pressure, and phase separation followed by distillation.

13. The salt of claim 12, wherein the process further comprises milling the resulting solid.

14. A salt of a hydrophobic etheramine and of a polymeric acid obtainable by a process comprising the following steps:
a) the reaction of glycerine or 1,1,1-trimethylolpropane with at least one of butylene oxide and propylene oxide, wherein the molar ratio of glycerine or 1,1,1-trimethylolpropane to butylene oxide and/or propylene oxide is in the range of 1:3 to 1:10 (compound C),
b) the amination of the alkoxylated glycerine or 1,1,1-trimethylolpropane (compound A) with ammonia in the presence of a catalysator (compound D),
c) the mixing of compound D to an aqueous solution of a polymeric acid at 25° C., wherein the molar ratio of the polycarboxylic acid groups to amino groups in compound B lies in the range of 100:1 to 1:1,
d) the removal of the water from the aqueous solution by one of spray-drying using a gas with an inlet temperature of at least 125° C. spray granulation using a gas with an inlet temperature of at least 125° C. distillation under reduced pressure, and phase separation followed by distillation.

15. The salt of claim 14, wherein the process further comprises milling the resulting solid.

16. A salt of a hydrophobic etheramine and of a polymeric acid obtainable by a process comprising the following steps:
a) the reaction of 1,2-dialcohols of formula (VII) with at least one of propylene oxide and butylene oxide, wherein the molar ratio of 1,2-dialcohol to propylene oxide and/or butylene oxide is in the range of 1:2 to 1:100,

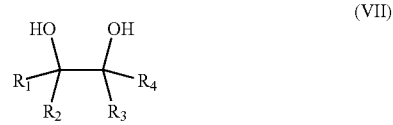

wherein $R_1$, $R_2$, $R_3$ and $R_4$ are independently selected from the group consisting of H and a linear or branched alkyl group with 2 to 16 carbon atoms (compound E),
b) the amination of the alkoxylated 1,2-dialcohol (compound E) with ammonia in the presence of a catalysator (compound F),
c) the mixing of compound F to an aqueous solution of a polymeric acid at 25° C., wherein the molar ratio of the polycarboxylic acid groups to amino groups in compound B lies in the range of 100:1 to 1:1,
d) the removal of the water from the aqueous solution by one of spray-drying using a gas with an inlet temperature of at least 125° C. spray granulation using a gas with an inlet temperature of at least 125° C. distillation under reduced pressure, and or by phase separation followed by distillation.

17. The salt of claim 16, wherein the process further comprises milling the resulting solid.

* * * * *